Dec. 12, 1967 M. E. GERRY 3,357,302

AUTOMATIC SOUND AND SLIDE PROJECTOR CONTROL MECHANISM

Filed Dec. 22, 1965 3 Sheets-Sheet 1

INVENTOR.

Martin E. Gerry

INVENTOR.
Martin E Gerry

Dec. 12, 1967 M. E. GERRY 3,357,302

AUTOMATIC SOUND AND SLIDE PROJECTOR CONTROL MECHANISM

Filed Dec. 22, 1965 3 Sheets-Sheet 3

INVENTOR.

Martin E. Gerry

United States Patent Office 3,357,302
Patented Dec. 12, 1967

3,357,302
AUTOMATIC SOUND AND SLIDE PROJECTOR CONTROL MECHANISM

Martin E. Gerry, 13452 Winthrope St., Santa Ana, Calif. 92705

Filed Dec. 22, 1965, Ser. No. 515,790
5 Claims. (Cl. 88—26)

ABSTRACT OF THE DISCLOSURE

The invention relates to a cartridge contained in an audio-visual apparatus wherein the cartridge containing visual information and a sound track and a means for controlling the quantity of sound recorded and reproduced from the sound track. It also relates to the method for automatically stopping and rewinding a sound track tape to its starting position.

The present invention relates to a mechanism for automatically controlling a sound and slide projector.

An object of the present invention is to provide a means for creating an inexpensive and simple automatic control mechanism, which will cause the projector to automatically rewind its sound track means when the terminal position of a tape recording sound track means is reached, and to have the automatic control mechanism reset itself, and when reset, to await a recycle pulse to eject the used cartridge, inject a new cartridge, and to begin a new record-reproduce cycle.

A further object of the present invention is to provide a manually operated automatic control means or an automatically operated automatic control means for interrupting the sound recording tape automatically at any point of the tape length, automatically rewind the tape, and automatically reset the control means.

Still a further object of the invention is to provide a means for automatically successively injecting new cartridges either upon complete utilization or run-out of tape in the cartridge, or upon automatically stopping the tape drive means at the predetermined point of the tape length.

Briefly, in accordance with a preferred form of the present invention, a combined slide and sound projector includes a sound reproduction system comprised of a single magnetic record-reproduce head, mounted on a support plate and oriented so that the magnetic record-reproduce head gap is tangent to the magnetically coated tape material which traverses between two spools located within a cartridge containing the combined slide and magnetic recording reproducing material wound on the spools retained therein. One motor rotates the spool tape past the magnetic head gap, while another motor of opposite rotational direction rewinds the tape to its normal initiating position, when the tape has been exhausted, or when automatically stopped at any predetermined position on the tape length.

Another advantageous feature of the preferred embodiment is its provision of a means for automatically stopping the sound reproduction at the end of each tape, or at any predetermined position along the tape length prior to the end of tape position. This arresting means preferably includes an end of tape overcurrent relay in series with a reproduce drive motor, which is activated when larger than normal current flows in the motor, because, with power applied to the motor, the motor shaft is momentarily held by the tape which is stationary and in tension. Holding of the motor shaft in a stationary position will prevent the motor from building up an internal counter-electromotive force and thereby cause large currents to flow in the motor circuit. A low frequency tone generator is used in combination with the amplifier to record a low frequency tone on the tape at any desired location. This tone will be reproduced with the record-reproduce head in the reproduce position in combination with a low frequency pass filter, a transistor amplifier and a relay to automatically stop the reproduction of sound from the tape when the magnetic head senses the tone impressed on the tape. Similarly, at the end of the rewind cycle, the tape is held in tension and the rewind motor rotor is held stationary by the sound track tape, causing higher than normal currents to flow through the end of rewind cycle relay, thereby momentarily activating this relay, and causing the control cycle mechanism to be enabled for recycling.

Still another feature of the preferred embodiment of this invention is means for automatically feeding the cartridges in sequence. A motor driven sound-slide cartridge injector assembly translates a cartridge within the projector to a cartridge carrier magazine, which magazine is then translated a predetermined distance by an index gear engaged with a rack. In this manner, when the sound-slide cartridge injector assembly is returned, it engages the sound-slide cartridge immediately adjacent to the one previously used. Means are also provided to sequence the next cartridge either at the end of tape or when the record-reproduce head senses the low frequency tone on a predetermined point of the tape. Means are also provided by a motor driven cam with a slidebar cam pivot pin and a slidebar, to couple the slidebar with the cam and the C-bar cartridge holder pivot extension pin with the other end of the slidebar, providing a simple injection or ejection of the sound-slide cartridge, when the motor driven cam is rotated due to the motor being electrically energized.

A more thorough understanding of the invention may be obtained by a study of the following detailed description taken in conjunction with the accompanying drawings in which:

FIG. 1 is a top view partially in cross-section, showing the sound-slide cartridge transport mechanism, the cartridge carrier magazine and rack, the magnetic record-reproduce head assembly, a detailed cross-section view of the magnetically off-center drive motor construction, the rewind motor, the optical assembly, part of the cartridge carrier magazine indexing mechanism, and cam activated switches;

FIG. 2 is a perspective view partially cut away and in cross-section of the sound-slide cartridge, displaying the details of the internal construction of the cartridge including the spools which are retained in recessed depressions and which retain the sound reproducing tape thereon, and showing the manner of assembly of the slide into the cartridge and the assembly of the cover with the cartridge case;

Figure 1:
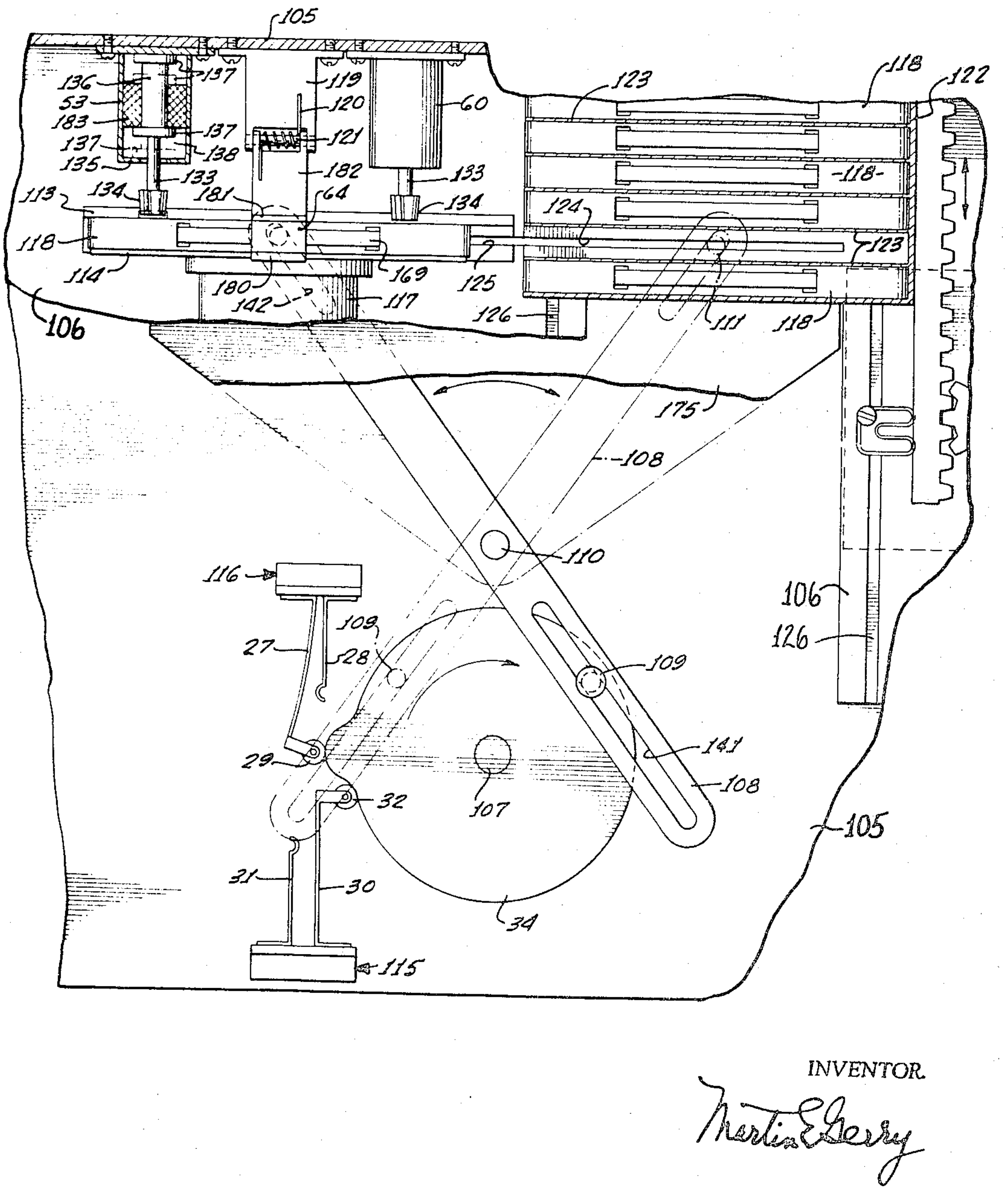
Figure 2:
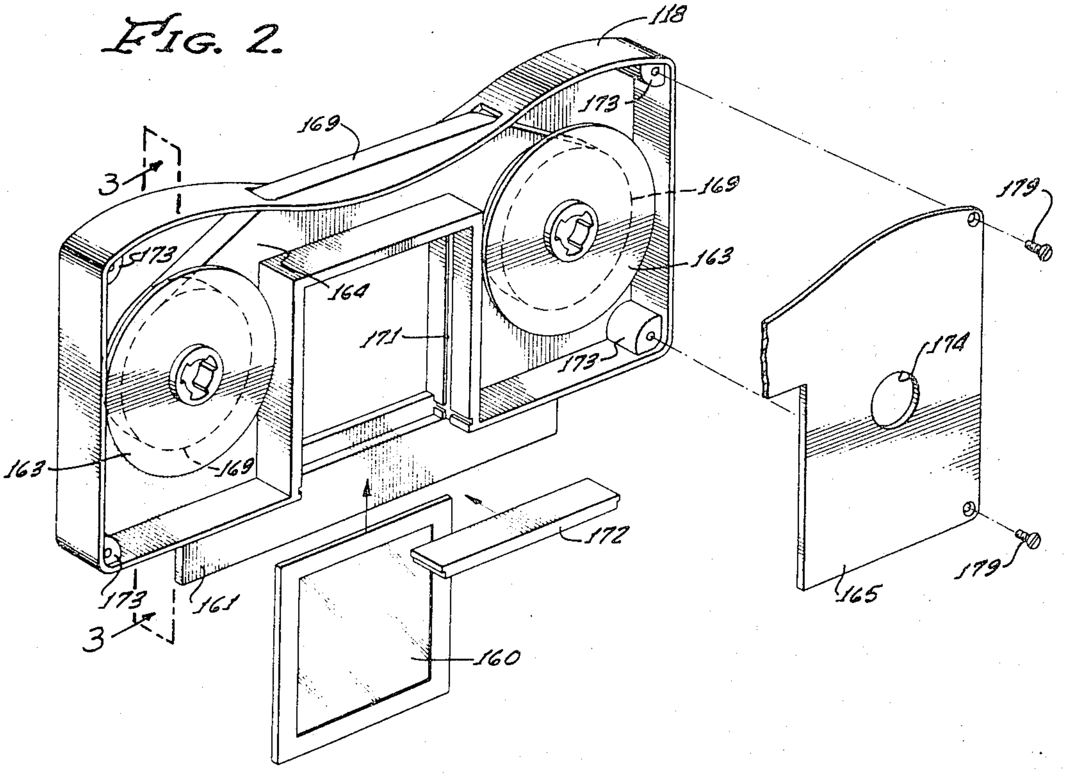
Figure 3:
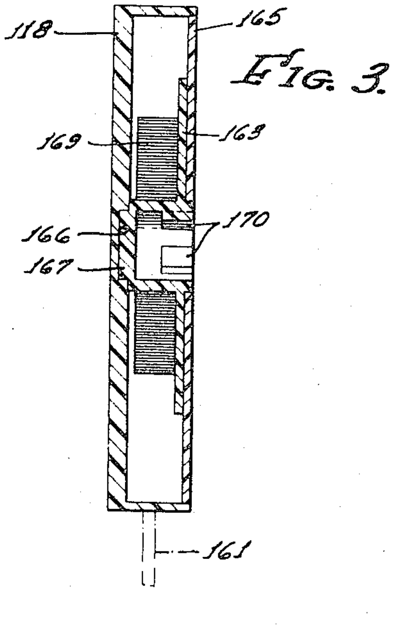
FIG. 3 is a cross-sectional view taken along plane 3—3 of FIG. 2, showing an assembled sound-slide cartridge, and detailing the manner in which the spool is retained and held within the cartridge, and the spool keyway and cover aperture showing the access of the motor drive shaft with keyed end into the spool keyway.
Figure 4:
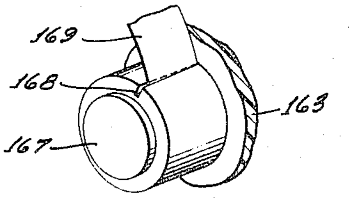
FIG. 4 is a partial perspective view, partially in cross-section of the spool, showing the manner in which the tape is retained and held by the slotted portion of the spool by wedging of the tape into the slot.

*Main chassis support structure.*—Referring to FIG. 1, sub-assembly mounting plate 106 is mechanically affixed by screws or by welding to the vertical portion of main chassis support structure 105. This sub-assembly mounting plate 106 is rigidly supported by vertical columns (not shown) between the horizontal planes of structure 105 and mounting plate 106. C-bar support plate 175 is parallel to and located under plate 106 in the horizontal plane, and is mechanically affixed to main chassis structure 105 by means of screws. Affixed by screws or other mechanical means to the vertical plane portion of support base 105, are loud speaker 65, record-reproduce drive motor 53, rewind recording means motor 60, and magnetic record-reproduce head assembly mounting 119. Affixed by screws or other mechanical means to the horizontal segment of main chassis support structure are switches 115 and 116, and injection motor 35. The upper portion of the vertical members of the main chassis support structure 105 is split at the top and has two 90 degree bends which comprise a forward-reverse guide channel for sound-slide cartridge carrier magazine 122.

*Sub-assembly mounting plate.*—Referring to FIG. 1, sub-assembly mounting plate 106 mechanically holds and retains by means of screws or other means cartridge guide and optical assembly mounting bracket 114 to which is mounted and mechanically affixed optical assembly 117, sound-slide cartridge guide bracket 113, slidebar pivot pin 110, and cartridge carrier magazine 122. Cartridge carrier magazine 122 rides on the upper surface of sub-assembly mounting plate 106 in grooves 126. Said magazine 122 has a rack mechanically attached to its side, said rack engages with a gear for forward or reverse indexing. Said magazine 122 retains sound-slide cartridge 118. Cartridge extension 161 extends through slot 125 when said cartridge 118 is injected into position directly behind the optical assembly 117, and cartridges 118 extend through slots 124 at the base of magazine 122, and are situated between each of magazine divider panels 123.

*Cycle programming means.*—Referring to FIG. 1, an injector cycle control switch 116 comprised of moving contact element 27 and stationary contact element 28 and insulating roller 29 mechanically attached to the tip of moving contact element 27 cooperates with the extended or high portion of injector motor programming cam 34 at the beginning of the cartridge injection cycle. Cam 34 is mechanically held by a set screw to shaft 107 of injector motor 33. Both switch 116 and casing of motor 33 are mechanically held by screws fastened to horizontal member of main chassis support structure 105.

A start relay momentary enable switch 115 is comprised of moving contact element 30 and stationary contact element 31 and insulating roller 32 situated at the tip of moving contact 30 cooperates with cam 34 hereinabove described, and towards the end of each of sound-slide cartridge injection cycle, when the cam has almost substantially completed 360 degrees of clockwise rotation, the extended or high portion of cam 34 cooperating with insulating roller 32, causes cooperation and mechanical contact to be made substantially momentarily between movable contact 30 and stationary contact 31 to electrically energize start-relay 35 (FIG. 5) hereinafter described. Switch 115 is mechanically held by screws fastened to the horizontal member of main chassis support structure 105.

Cam 34 also includes a slidebar pivot guide 109, extended from and mechanically screwed into side of cam 34. The slidebar pivot guide 109 is inserted in slidebar cam slot 141 of slidebar 108 so as to cooperate with said slidebar cam slot 141 and guide slidebar 108 during the sound-slide cartridge injection cycle.

*Sound-slide cartridge transporting, positioning and registration means.*—Referring to FIG. 1, slidebar 108 is mounted to sub-assembly mounting plate 175 by pivot pin 110 and engaged cooperatively with slidebar pivot guide 109 of cam 34 in slot 141 on one end of the slidebar 108, and engaged cooperatively with pivot pin 111 of a C-bar transporter (not shown) in slot 142 of slidebar 108, said slidebar 108 pivots about pin 110 due to clockwise rotation of cam 34 which is coupled to shaft 107 of motor

33, being rotated due to the fact that motor 33 had been electrically energized, thereby translating sound-slide cartridge 118 from its position directly at the rear of the optical assembly 117 to its retaining section between cartridge carrier magazine dividing panels 123 within sound-slide cartridge carrier magazine 122. Translatory motion of sound-slide cartridge 118 together with translatory motion of the C-bar mechanism, will result in sound-slide cartridge guide extension 161 being moved from slot 125 to slot 124 upon completion of 180 degree rotation of cam 34, due to engagement of an indexing mechanism and advancing or reversing cartridge carrier magazine 122 to its next indexed position, causing the C-bar cartridge mechanism to release the transported sound-slide cartridge 118 and engage the next indexed sound-slide cartridge 118 which upon completion of 360 degrees rotation of cam 34, the next sound-slide cartridge 118 will be injected into exact position of axial alignment and registration of shafts of motors 53 and 60 with apertures 174 and keyways 170 for record-reproduce or rewind action in accordance with the programmed control cycle to be hereinafter described. Cam 34 stops because motor 33 is electrically deenergized by contact 27 ceasing to cooperate with contact 28 due to roller 29 cooperating with the high portion of cam 34.

*Integration of sound means with visual means in a single long-playing cartridge.*—Referring to FIGS. 1, 2, 3 and 4, means are provided for integration of long recording or reproducing of sound integrated with a slide in a compact and simple sound-slide cartridge 118. The cartridge consists of a plastic or other material spool retainer case 164 having as an integral part of this case inserts 173 for mechanically affixing therein a cover 165 with two apertures 174, by means of screws 179. (Only a section of cover 165 is shown.) Also, as an integral part of case 164 is cartridge guide extension 161 used for guiding and translating cartridge 118 by suitable means described in this specification. Mounted in each of the two recesses 166 is projection 167 of spools 163 on which are wound magnetic tape 169. The ends of magnetic tape 169 are friction held by slots 168 in which tape ends are inserted, or are held in slots 168 by means of fillets mechanically affixed to the ends of tape 169 and inserted into slots 168 (fillets not shown). Tape 169 is threaded through two slots or apertures at the top of spool retainer case 164 prior to inserting ends of tape into their respective slots of the left and right spools. Each tape spool 163 has a fluted or notched keyway 170 axially aligned with cover apertures 174 for admission of record-reproduce or rewind motor pinions 134, or of fluted shafts, the keyways are structured so as to exactly fit with the pinions 134 or with the fluted shafts. The quantity of tape that may be stored on a spool is large enough to enable the recording or reproducing of approximately one-half to one hour of sound in substantially small amount of space. Groove 171 is provided in a substantially square or rectangular window of the spool retainer case 164 for insertion of a photographic or other slide 160 in the direction indicated on FIG. 2. Slide retainer panel 172 is inserted into a horizontal groove at the bottom of the window of spool retainer case 164 in direction shown in FIG. 2, thereby retaining slide 160 securely in the window of case 164. Assembling the parts as hereinabove described results in the integrated sound-slide cartridge 118.

Figure 5:
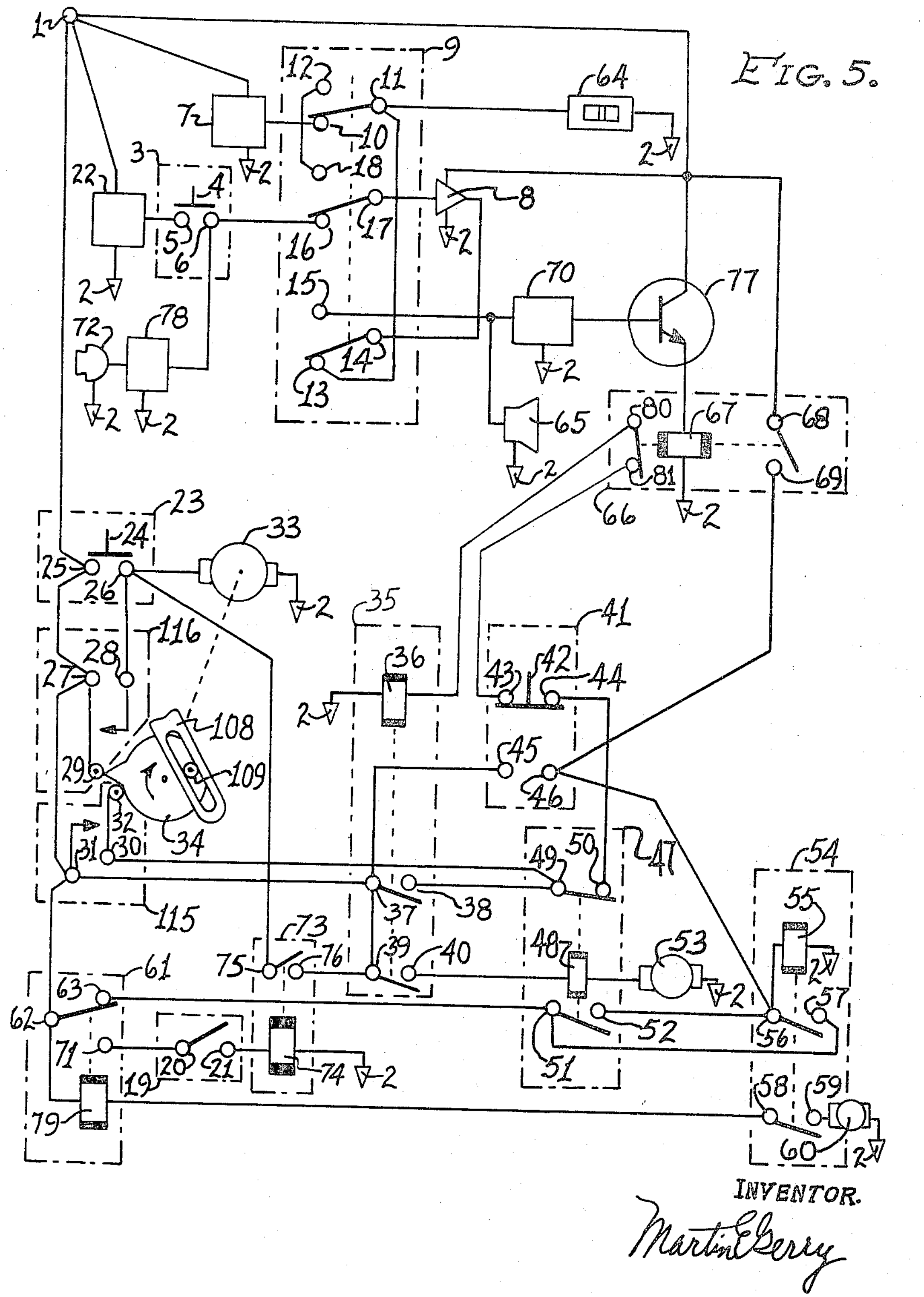
FIG. 5 is a circuit schematic of the control and record-reproduce circuitry of a sound and slide projector in connection with this invention.

*Cartridge injection cycle.*—Referring to FIGS. 1 and 5, this cycle is started when start cycle push button 23 is manually momentarily depressed, starting motor 33 which rotates cam 34, mechanically attached to motor shaft 107, in a clockwise direction. Slidebar pivot guide 109 cooperates with and is inserted in slot 141 of slidebar 108, C-bar pivot pin 111 cooperates with and is inserted in slot 142 of said slidebar 108, and slidebar pivot pin 110, held to mounting plate 175 enables the translation of said slidebar during rotation of cam 34, during the first 180 degrees of cam 34 rotation from slidebar 108 initial position wherein cartridge 118 is injected behind bracket and cartridge guide 114 to its translated position in compartment in magazine 122 between magazine divider panels 123, and during the next 180 degrees of cam 34 rotation, after indexing mechanism has been moved thereby moving magazine 122 forward or backward so that a new cartridge 118 is engaged, returns said slidebar 108 to its initial position as above described. During the first 90 degree rotation of cam 34, C-bar pivot pin 111 will move from its position in slot 142 from the end of slot 142 near the end of slidebar 108 to its opposite end of slot 142, and slidebar pivot guide 109 situated approximately midway in slot 141 will move to the end of slot 141 in a direction nearest pivot pin 110, which action will transport cartridge 118 midway between its injected position behind bracket 114 and its stored position in magazine 122. During the next 90 degrees of cam 34 rotation, C-bar pivot pin 111 will move from its position at the end of slot 142 nearest pivot pin 110, to the end of slot 142 nearest the end of slidebar 108, and slidebar pivot guide 109 will move from the end of slot 141 back to its normal position approximately midway in said slot 141 as shown in FIG. 1, which action will transport cartridge 118 fully into magazine 122, cam 34 having completed 180 degrees of rotation. During the following 90 degrees of rotation of cam 34, C-bar pivot pin 111 will move from its position at the extreme end of slot 142 towards the end of slidebar 108 towards its opposite end within the same slot 142, and slidebar pivot guide 109 now situated approximately midway in slot 141 will move in said slot 141 in a direction towards the end of slidebar 108, which action will transport the newly engaged cartridge 118 from its location within magazine 122 to a point midway between said magazine 122 and its normally injected position behind bracket 114. During the last 90 degrees of cam 34 rotation, C-bar pivot pin 111 will move from its position at the extreme end of slot 142 nearest pivot pin 110 to its opposite end of slot 142 nearest the end of slidebar 108, and slidebar pivot guide 109 will move in slot 141 in a direction away from the end of slidebar 108 towards its normal initial position approximately midway in said slot 141 as shown in FIG. 1, which action will transport cartridge 118 to its injected position directly behind mounting bracket 114; the used cartridge 118 having been ejected and a new cartridge 118 having been injected, and cooperation of pivot guide 109 with slot 141 as well as cooperation of pivot pin 111 with slot 142 having occurred during the 360 degrees of cam 34 rotation. Stopping of cam 34 rotation is achieved by virtue of said cam 34 having moved contact 27 away from contact 28 by cooperation of the high point of cam 34 with roller 29, mechanically affixed to the tip of moving contact 27, so that contacts 28 and 27 no longer cooperate with each other thus electrically disconnecting power means from motor 33 and stopping rotation of said motor 33 and said cam 34 mounted on shaft of said motor 33.

*Overall operation of sound reproduction means.*—As shown in FIGS. 1, 2, 3, and 4, electrical motors 53 and 60 are mechanically affixed by their motor casings 135 to the vertical plane section of the main chassis support structure 105. These motors each have stationary fields 183 and armatures 136, which have end positioning bushings 137, shafts 133, and pinions 134 mounted on the axes of rotation of armatures 136. When no electrical energy is applied to motors 53 or 60, the armatures or rotors are positioned as shown, towards the extreme rear of the motor casings 135, thereby providing spaces 138 between the front bushings 137 and motor casings 135. These motors are purposely designed to be magnetically unbalanced in the electrically deenergized positions, favoring the mechanical relationships above described. But when motors are electrically energized the armatures will move along and about the axes of shafts 133 in motor cases 135 to find their magnetic centers, closing the gaps 138 between the front bushings 137 and motor casings 135, thereby causing pinions 134 to move through apertures 174 of sound-slide cartridge 118, engaging keyways 170 at the axes of magnetic tape spools 163, to rotate such spools in a clockwise direction by motor 53 for recording or reproducing sound, or in a counterclockwise direction by motor 60 for rewinding magnetic tape 169.

Magnetic tape 169 is held by frictional contact between tape 169 and slots 168, or by fillet stops at the ends of tape 169 wedged in slots 168 of each of spools 163. Projections 167 are seated in sound-slide cartridge case recesses 166. Spool retainer case cover 165 is mechanically held to sound-slide cartridge case 118 by screws 179 inserted into tapped inserts 173.

When record-reproduce motor 53 is energized, and as above described spools 163 are rotating in a clockwise direction, or when rewind motor 60 is energized and as above described spools 163 are rotating in a counterclockwise direction, the magnetic tape cooperates with the gap of magnetic head 64, moving tangentially to the face of and across the gap of magnetic head 64. Magnetic head 64 is mechanically affixed to front guide plate 180 and to rear guide plate 181, both guide plates used for exact alignment of magnetic head gap with magnetic tape transported within the sound-slide cartridge 118. Rear guide plate 181 is mechanically held to reproducing head mounting block 182. Reproducing head mounting block 182 is mechanically held by pivot pin 121 coaxially positioned within head tension spring 120, and both pivot pin 121 and spring 120 are used to mechanically join reproducing assembly mounting block 119 with head mounting block 182. Block 119 is mechanically attached to vertical section of main chassis support structure 105 by means of screws. Spring 120 exerts tension on head mounting block 182 so that when cartridge 118 is being inserted in position behind the optical assembly 117, reproducing head mounting block 182 is permitted to swivel upward and then return to be supported by the edges of the sound-slide cartridge 118 due to cooperation of plates 180 and 181 with the sound-slide cartridge 118.

Limit stop pin (not shown), is mechanically mounted to the lower surface of head mounting block 182 which cooperates with and wedges against lower surface of reproducing assembly mounting block 119 to substantially prevent spring 120 from swiveling block 182 below its normal reproducing position inasmuch as during transport of sound-slide cartridge 118 said sound-slide cartridge 118 is not always cooperating with guide plates 180 and 181.

*Electrical circuit schematic.*—The automated transporter, recorder-reproducer, and rewinder control circuit is schematically shown in FIG. 5, and is comprised of direct current power means 1, and common power and signal return means 2, and common power and signal return means 2 is also the negative potential terminal of a direct current power means. Direct current power means 1 is electrically connected by means of wire to modulator 7, to amplifier 8, to movable contactor 68 of relay 66, to collector terminal of transistor 77, to contact 25 of start cycle push button, to contact 27 of injection cycle switch 116, to contact 31 of start relay momentary enable switch 115, to movable contact 62 of relay 61, to coil 79 of relay 61, to movable contact 37 of relay 35, to movable contact 39 of relay 35, to stationary contact 76 of relay 73, to stationary contact 45 of push button 41, and to low frequency tone generator 22. Common power and signal return means 2 is electrically connected by means of wire to return sides of tone generator 22, modulator 7, record-reproduce head 64, microphone 72, high pass filter 78, amplifier 8, low pass filter 70, loud speaker 65, coil 67 of relay 66, motor 33, coil 74 of relay 73, motor 53, coil 55 of relay 54, motor 60, and coil 36 of relay 35.

Power means 1 and common power and signal return means 2 are therefore provided to all components requiring same as shown in FIG. 5.

Output of tone generator 22 is electrically connected by means of wire to stationary contact 5 of tone signal injection push button 3, and output of microphone 72 is electrically connected by means of wire to input terminal of high pass filter 78 which is designed to pass all frequencies above 150 cycles per second and output of filter 78 is electrically connected to stationary contact 6 of push button 3 and thence to stationary contact 16 of record-reproduce switch 9 which cooperates with movable contact 17 of said switch 9 in the recording mode, and contact 17 is further electrically connected to the input of amplifier 8, said amplifier 8 output being electrically connected to movable contact 14 of switch 9 which in the recording mode cooperates with stationary contact 13 of switch 9, and contact 13 is further electrically connected by means of wire to movable contact 11 which in the recording mode cooperates with stationary contact 10 of switch 9, said stationary contact 10 being electrically connected by means of wire to the output of high frequency modulator 7. Movable contact 11 is also electrically connected by means of wire to magnetic recording head 64. It is normally possible to impress audio frequencies above 150 cycles per second through microphone 72 filter 78, switch 9, amplifier 8, and modulated signal from modulator 7 all into record-reproduce head 64 and on to a magnetic tape 169. By manually momentarily depressing movable contactor 4 of push button 3, causing contactor 4 to cooperate with contacts 5 and 6, a tone at a predetermined frequency below 150 cycles per second is applied by tone generator 22 in a manner similar to that of the recording of voice through the microphone 72, through the record-reproduce head 64 on to a predetermined location on the magnetic tape 169, which location is selected when no further recording on the tape within the cartridge is desired.

When the record-reproduce switch 9 is in the reproduce mode, movable contact 11 cooperates with stationary contact 12, movable contact 17 cooperates with stationary contact 18, and movable contact 14 cooperates with stationary contact 15. Further, stationary contact 12 is electrically connected by means of wire to stationary contact 18, stationary contact 15 is electrically connected by means of wire to the input terminal of loud speaker 65 and the input terminal of low pass filter 70, which passes all frequencies below 150 cycles per second, attenuating frequencies above 150 cycles per second. The output of filter 70 is electrically connected by means of wire to the input terminal or base of transistor amplifier 77 which amplifies filter 70 output. Switch 9 is shown in FIG. 5 with its movable contacts in the record mode. In its position opposite to that shown in FIG. 5 switch 9 would be in the reproduce mode. During the record mode, two types of recordings are possible. Normal voice containing frequencies above 150 cycles per second but in the audio range, and a special signal for controlling the stopping of magnetic tape 169 comprised of frequencies below 150 cycles per second. Normal voice is recorded of audio frequencies above 150 cycles per second, filter 78 rejecting all frequencies below 150 cycles per second and passing all frequencies above 150 cycles per second when voice frequencies containing both bands above and below 150 cycles are impressed upon microphone 72. Therefore, only voice frequencies above 150 cycles will be impressed upon magnetic tape 169 when in cooperation with head 64. However, should one desire to terminate recording when only a partial portion of tape 169 has been recorded on, a signal from the band of frequencies below 150 cycles per second is recorded on this tape at that point by the same head 64. The source for this signal is generator 22, and the means for recording this signal below 150 cycles per second is push button 4 which is manually momentarily depressed causing contacts 4, 5, and 6 to cooperate. During the time signal from generator 22 is being recorded on tape 169, voice of frequency band above 150 cycles per second is not being recorded on said tape 169. The only reason for use of filter 78, therefore is to avoid having components below 150 cycles per second as recorded content of audio components, inasmuch as the presence of frequencies below 150 cycles per second on tape 169 mixed with an audio or voice signal representing intelligence on the same tape 169 at the same place on the tape will cause filter 70 to respond to these low frequency contents and cause premature cessation of reproduction of sound when in the reproduce mode or a periodic activation of relay 66. Filter 70 will reject all frequencies above 150 cycles and pass all frequencies below 150 cycles. Filter 70 output is an input to transistor current amplifier 77 which is a NPN junction transistor where the collector has applied thereto D.C. power 1, the base has applied thereto the output control signal below 150 cycles per second passing through filter 70, and the emitter has connected thereto coil 67 of relay 66, the return side of coil 67 being at ground or signal return potential 2. During the reproduce mode, frequencies above 150 cycles per second are reproduced from tape 169 by head 64 and applied to input of amplifier 8 and to loud speaker 65. Since the audio content below 150 cycles per second have already previously been discriminated against by filter 78 during the record mode, frequencies below 150 cycles will not be present and hence will not be passed through amplifier 8 and loud speaker 65. Frequencies below 150 cycles per second will likewise be available at input to filter 70. The exception to the above being that when normal voice recording (without frequencies below 150 cycles) is desired to be terminated at any point along the length of tape 169, then when switch 9 is in the record mode on completion of the said normal voice recording, push button 3 is manually momentarily depressed, thereby recording the said below 150 cycle frequency signal on the tape 169. Frequencies below 150 cycles are sensed during the reproduction mode by virtue of head 64 cooperating with tape 169, the head output signal being applied to amplifier 8, filter 70, amplifier 77, and coil 67 of relay 66 which is responsive to the current flow in the emitter circuit of the NPN transistor amplifier 77. Speaker 65 will be responsive to both the above 150 cycles and the below 150 cycles signals, however the speaker 65 will reproduce the below 150 cycle signal when same has already been purposely recorded on tape 169 by head 64 at the specific time of terminating the recording and for the specific purpose of terminating the reproducing of sound from said tape 169 as impressed through microphone 72. Only at that time and point on tape 169 will the below 150 cycle tone be heard in speaker 65. However, being at the end of the reproduction of voice frequencies on tape 169, the audibility of the below 150 cycle tone will not constitute an objectionable noise or interference with normally reproduced intelligence, inasmuch as no voice intelligence (about 150 cycles) is recorded on tape 169 beyond this point.

As above stated, the tone signal below 150 cycles per second however will be passed by transistor amplifier 77 causing an amplified current to flow in the emitter circuit and hence in coil 67 of relay 66, thereby causing a voltage to be developed across the winding 67 due to the amplified current, and energize coil 67 so that contacts 68 and 69 cooperate with each other and contacts 80 and 81 cease to cooperate with each other for the momentary duration that the tone signal previously recorded and present on tape 169 is reproduced by the above described network.

The following component parts of FIG. 5 are electrically connected to each other by means of wire: Stationary contact 26 of start cycle push button 23 to stationary contact 28 of injector cycle switch 116, stationary contact 26 to input terminal of injector motor 33, stationary contact 26 to movable contact 75 of relay 73, movable contact 30 of start relay momentary enable switch 115 to movable contact 49 of end of tape overcurrent relay 47, stationary contact 38 of start relay 35 to movable contact 49 of relay 47, stationary contact 50 of relay 47 to stationary contact 44 of interrupt cycle push button 41, stationary contact 43 of push button 41 to stationary contact 81 of relay 66 which normally cooperates with movable contact 80 of relay 66 electrically connected by means of wire to the input side of coil 36 of relay 35, stationary contact 71 of end of rewind cycle relay 61 to movable contact 20 of automatic-recycle-on switch 19, stationary contact 21 of switch 19 to input terminal of coil 74 of automatic recycle relay 73, stationary contact 63 of relay 61 to movable contact 51 of relay 47 and to stationary contact 57 of rewind cycle relay 54, the return side of coil 79 of relay 61 to movable contact 58 of relay 54, stationary contact 59 of relay 54 to input side of tape rewind motor 60, stationary contact 40 of relay 35 to input side of overcurrent sensing coil 48 of relay 47, the return side of coil 47 to the input side of tape drive motor 53, stationary contact 52 of relay 47 to movable contact 56 of relay 54 and to the input side of coil 55 of relay 54 and to stationary contact 46 of push button 41 and to stationary contact 69 of automatic tone interrupt cycle relay 66.

In the normally pre-cycle state, the control circuit active elements are positioned so that contacts 25 and 26 do not cooperate with contactor 24, contacts 27 and 28 do not cooperate with each other, the high point of cam 34 cooperates with roller 29 of movable contact 27, the low point of cam 34 cooperates with roller 32 of movable contact 30, contacts 30 and 31 do not cooperate with each other, contacts 62 and 63 of relay 61 cooperate with each other whereas contacts 62 and 71 of relay 61 do not cooperate with each other, contacts 20 and 21 of switch 19 do not cooperate with each other, contacts 75 and 76 of relay 73 do not cooperate with each other, contacts 37 and 38 of relay 35 do not cooperate with each other, contacts 39 and 40 of relay 35 do not cooperate with each other, contacts 43 and 44 cooperate with contactor 42 of push button 41, contacts 45 and 46 do not cooperate with contactor 42 of push button 41, contacts 49 and 50 of relay 47 cooperate with each other, contacts 51 and 52 of relay 47 do not cooperate with each other, contacts 56 and 57 of relay 54 do not cooperate with each other, contacts 58 and 59 of relay 54 do not cooperate with each other, contacts 68 and 69 of relay 66 do not cooperate with each other, and contacts 80 and 81 of relay 66 cooperate with each other.

*Cooperation of component parts prior to circuit operation.*—Referring to FIG. 5, the schematic shows the normal pre-operative mode of the control circuit components. Excepting for record-reproduce switch 9 hereinabove described, roller 29 attached to the tip of moving contact 27 of the injection cycle switch, cooperates with the extended or high portion of cam 34 and thereby contact 27 will cooperate with contact 28 at substantially most of the 360 degrees of cam 34 rotation excepting when the high point of cam 34 cooperates with roller 29; roller 32 attached to the tip of movable contact 30 and cooperating with cam 34 will cooperate with contact 31 of the start recording cycle momentary switch only during a very small fraction of the cam 34 rotation, said cam 34 rotating clockwise will cause its extended or high portion to move contact 30 so it momentarily cooperates with contact 31, near the completion of the 360 degrees of cam 34 rotation, thereby causing direct current power to be momentarily applied to coil 36 of start relay 35, through cooperating contacts 49 and 50 of relay 47, and through cooperating contacts 44, 43, and 42 of interrupt cycle push button 41. Cooperating contact 62 and 63 of end of rewind cycle relay 61 provide a direct current power path to contact 51 of end of tape overcurrent relay 47 and to contact 57 of rewind cycle relay 54. Tape drive motor 53 being geared down for slow drive speeds, is substantially slow in starting, so that when it is electrically energized by virtue of pull-in action of armature of start relay 35 which causes contacts 39 and 40 of relay 35 to cooperate with each other and apply direct current power through coil 48 of relay 47 to said motor 53, cam 34 had come to a complete stop after its 360 degree rotation, and cartridge injection had been by this time completed.

*Control circuit operation sequence.*—Referring to FIG. 5 with the record-reproduce switch in either the record or reproduce position thereby electrically connecting the record or reproduce components as heretofore described, when start cycle push button 23 is momentarily manually depressed causing contactor 24 to momentarily cooperate with contacts 25 and 26, which causes injection motor 33 to be electrically energized starting clockwise rotation of cam 34 mechanically affixed to shaft of said motor 33, thereby causing roller 29 to cease cooperating with the high point of cam 34 and causing movable contact 27 attached to roller 29 to cooperate with contact 28 thereby applying electrical power to said motor 33 for the duration of the 360 degrees of cam 34 rotation (until the high point of cam 34 again disconnects or pulls apart the cooperating contacts 27 and 28). At substantially completion of cam 34 rotation, direct current power is momentarily applied to coil 36 of start relay 35 thereby causing contacts 37 and 38 to cooperate with each other and causing contacts 39 and 40 to cooperate with each other. Contacts 37 and 38 are holding contacts which hold the start relay coil 36 electrically energized for the duration of the record-reproduce cycle except when said cycle is purposely interrupted by manually momentarily depressing push button 41, wherein contacts 39 and 40 cease to cooperate and remove power applied through coil 48 of relay 47 from record-reproduce tape drive motor 53, momentary application of direct current power to above described coil 36 occurs during rotation of cam 34 when the high point of cam 34 causes cooperation of contacts 30 and 31 momentarily.

Motor 53 continues to transport tape 169 until said tape has been exhausted from the record-reproduce spool thereby mechanically stopping shaft 133 of motor 53 because tape 169 is held in tension between the shaft of energized motor 53 and said tape held mechanically in slot 168 of the other spool 163 thereby causing a higher than normal current to flow through motor 53, and coil 48 of end of tape overcurrent relay 47, which is electrically in series with said motor 53, and therefore relay 47 will be activated due to overcurrent flow in coil 48, thereby causing cooperating contacts 49 and 50 to cease to cooperate with each other thus removing direct current power from coil 36 of start relay 35, thereby deenergizing said relay 35, causing contact pair 37 and 38 to cease cooperating, and contact pair 39 and 40 as well as contact pair 37 and 38 to cease cooperating, removing power from motor 53 and thereby due to magnetic center unbalance of said motor 53, will cause its shaft and pinion to be retracted from aperture 174 and keyway 170, disengaging record-reproduce spool 163, and contact 51 will momentarily cooperate with contact 52 thereby momentarily applying direct current power to relay coil 55 of rewind cycle relay 54, thereby energizing said relay 54 and causing holding contacts 56 and 57 to cooperate with each other, thereby holding relay 54 energized as well as causing contacts 58 and 59 to cooperate with each other, thereby causing direct current power to be applied to tape rewind motor 60 in series with coil 79 of end of rewind cycle relay 61, thereby energizing said tape rewind motor 60, causing its shaft and pinion attached to the rotor of motor 60 to be inserted in aperture 174 and cooperate with spool keyway 170 due to said motor rotor seeking its magnetic center as heretofore described, and said motor shaft beginning to rotate, thereby rewinding tape 169 on rewind spool 163.

When said rewind spool 163 rotated by tape rewind motor 60 exhausts the tape 169 from record-reproduce take up spool and fully translates and deposits tape 169 on said rewind spool, thereby mechanically stopping shaft 133 or rewind motor 60 because tape 169 is held in tension between shaft of electrically energized rewind motor 60 and mechanically held in slot 168 of the other spool 163, thereby causing a higher than normal current to flow through motor 60 and coil 79 of end or rewind cycle relay 61 which is electrically in series with said motor 60, therefore relay 61 will be activated due to overcurrent flow in its coil 79, thereby momentarily causing contacts 62 and 63 to cease cooperating with each other, and cause contacts 62 and 71 to cooperate with each other, momentarily removing direct current power from coil 55 of rewind cycle relay 5, causing holding contacts 56 and 57, and contacts 58 and 59 to cease cooperating with each other, thereby removing direct current power from tape rewind motor 60, and stopping same from rotating. Due to magnetic center unbalance of rotor of said motor 60, motor shaft and pinion will be withdrawn from aperture 174 and keyway 170, disengaging rewind spool and thereby ending the control sequence cycle, which may be started again by again manually momentarily depressing start cycle push button 23. The control sequence cycle may be automatically restarted without the necessity of manually depressing push button 23, if the automatic recycle-on-switch 19 had been previously manually operated so that contacts 20 and 21 cooperate with each other thereby providing direct current power to coil 74 of slow-pull-in and slow-release relay 73 by virtue of momentary cooperation of contacts 62 and 71, after contacts 62 and 63 had ceased to cooperate with each other, and relay 73 after a sufficient elapsed time delay to permit the automatic rewind action of motor 60 to be completed, will momentarily be energized causing contacts 75 and 76 to cooperate thereby applying power to motor 33 and restarting the control sequence cycle; relay 73 also being a slow release type will hold the contacts 75 and 76 in a cooperative relationship until a sufficient rotation of cam 34 has occurred causing contacts 28 and 29 to cooperate with each other and thereby taking over control of motor 33 from contacts 75 and 76 which will subsequently cease to cooperate with each other.

Manual stopping of recording or reproducing action and automatic rewinding prior to complete exhaustion of tape 169, is accomplished by momentarily manually depressing interrupt cycle push button 41 after the control circuit had been put into operation by manually depressing start cycle push button 23. This action causes contactor 42 which is cooperating with contacts 43 and 44 to cease to cooperate with said contacts 43 and 44, thereby removing direct current electrical power from coil 36 of start relay 35, which causes holding contacts 37 and 38 to cease cooperating with each other, thereby deenergizing and releasing the hold of relay coil 36 causing contacts 39 and 40 to cease cooperating with each other, thereby removing direct current power from motor 53 which drives spool 163 which takes-up tape 169 during recording or reproducing action, and causes said motor 53 to stop and retract its shaft with pinion mounted thereon from the spool keyway 170 and aperture 174 due to magnetic center unbalance of said motor 53 as heretofore described. Contactor 42 substantially simultaneously also cooperates momentarily with contacts 45 and 46, thereby momentarily applying direct current power to coil 55 of rewind cycle relay 54, momentarily energizing said relay 54 and causing its holding contacts 56 and 57 to cooperate with each other thereby maintaining said relay 54 in the energized state, causing contacts 58 and 59 to cooperate with each other and applying direct current power to tape rewind motor 60 in series with coil 79 of end of cycle rewind relay 61. Shaft of motor 60 with pinion mounted thereon, engages the tape rewind spool 163 in a manner hereinabove described, thereby rewinding said tape 169 to its initial starting position, at which time end of tape inserted and mechanically or frictionally held in tension in slot 168 of spool 163 and the rewound tape now stored on the rewind spool, holds shaft of rewind motor 60, preventing its rotation, which causes a greater than normal current to flow through said motor 60 and coil 79 of relay 61, which causes relay 61 to be activated and contacts 62 and 63 of said relay 61 to momentarily cease to cooperate with each other, thereby momentarily removing direct current power from coil 55 of relay 54, thereby deenergizing rewind cycle relay 54, and causing cooperating holding contacts 56 and 57 of relay 54 to cease cooperating with each other, and also causing cooperating contacts 58 and 59 to cease cooperating with each other thereby removing direct current power from rewind motor 60 and causing said motor 60 to stop rotating and to retract its shaft with pinion from spool keyway 170 and aperture 174, due to its magnetic center unbalance as hereinabove described, thereby ending the rewind cycle sequence. The control circuit sequence may now be again manually restarted by again manually momentarily depressing start cycle push button 23, or automatically repeated when contacts 20 and 21 of switch 19 cooperate with each other and as hereinabove described momentary cooperating contacts 62 and 71 of relay 61 automatically cause relay 73 to be energized.

Automatic stopping of reproducing action and automatic rewind prior to complete exhaustion of tape 169 is accomplished when the tape 169 has a tone signal of a frequency below 150 cycles per second magnetically recorded thereon at a predetermined location as hereinabove described. With the record-reproduce switch 9 in the reproduce mode, the tone signal below 150 cycles per second passing through filter 70 and amplified by transistor 77 causing a high current to flow in the emitter circuit of said transistor 77 in which coil 67 of automatic tone interrupt cycle relay 66 is in series, thereby causing contacts 68 and 69 of said relay 66 to cooperate with each other and causing cooperating contacts 80 and 81 to cease cooperating with each other, thereby causing direct current power to be momentarily removed from coil 36 of relay 35, causing contacts 37 and 38 to cease cooperating with each other and causing contacts 39 and 40 to cease cooperating with each other, thereby deenergizing and automatically stopping tape drive motor 53 and at the same time causing contacts 68 and 69 to momentarily cooperate with each other, momentarily applying direct current power to stationary contact 46 of interrupt cycle push button 41 and to contact 56 of relay 54 and coil 55 of relay 54. This action, caused by tone activation of relay 66 has the same effect as manually depressing contactor 42 which causes direct current power to be momentarily applied to contact 46, contact 56 and coil 55 of relay 54, as heretofore described. The remaining action of automatic termination of reproduce cycle is the same as the hereinabove described, which includes the energizing of relay 54, the rewind motor 60 energizing, the automatic stopping of said motor 60 by overcurrent flow in said motor 60 which causes momentary energizing of relay 61, and completing of the automatic termination of the reproduce cycle.

It is obvious that the cartridge 118 could be a sound track cartridge only when the above described visual information slide is deleted, and that if in the apparatus above described and illustrated by FIGS. 1, 2, 3, 4, and 5, the optical portions were deleted, the modified cartridge and apparatus would function as an automatic sound recording and reproducing apparatus with all the features of the sound-slide cartridge apparatus described hereinabove.

I claim:

1. In an apparatus for optically projecting visual information and recording and reproducing sound, a cartridge containing the combination of a sound track means and a slide, comprising a cartridge case which retains a pair of spools whose flanges are coplanar with each other and which retain the said sound track means,
recesses in said cartridge case which retain axial extensions of said pair of spools,
a cover for said cartridge case with two apertures at the same axes as the axes of the said spools,
keyways at the axis of rotation of each of the said pair of spools for insertion of keyed drive shafts,
a holding means in each of the said pair of spools for retaining and holding securely each end of the said sound track means, and
a window located in a plane parallel to the plane of the said flanges of said pair of spools for retaining therein a visual information slide.

2. The apparatus as described in claim 1, in combination with an automatic control means, comprising
a means for generating, and a means for recording a narrow band control signal at any point on said sound track means,
a means for descriminating against all frequencies except the frequencies contained in the said narrow band control signal,
a means for amplifying the said narrow band control signal,
a means for automatically deenergizing a motor driving the said sound track means at any pre-selected point of said sound track means,
a means for automatically rewinding the said sound track means, and
a means for automatically stopping the rewinding action of the said sound track means.

3. The automatic control means as described in claim 2, where
the means for automatically deenergizing the said motor driving the said sound track means is a first overcurrent means for sensing termination of unwinding of said sound track means due to holding action by said sound track means of rotor of said motor driving the said sound track means, and
the means for automatically stopping the said rewinding action of the said sound track means is a second overcurrent means, for sensing termination of rewinding of the said sound track means due to holding action by said sound track means of rotor of said rewind motor.

4. The automatic control means as described in claim 2, in combination with an automatic cycle repetition means, comprising
a switch means, and
a momentary automatic restart means, for momentarily energizing a cartridge injection means.

5. The apparatus as described in claim 2, in combination with a discrimination signal recorded at any point on said sound track means for automatic termination of sound track reproducing action and for initiating rewinding action of the said sound track means.

References Cited

UNITED STATES PATENTS

| | | | |
|---|---|---|---|
| 2,820,863 | 1/1958 | Swanson | 88—28 |
| 3,083,269 | 3/1963 | Gaubert | 274—11 |
| 3,187,626 | 6/1965 | Mindell et al. | 88—28 |
| 3,188,091 | 6/1965 | Goodell | 274—11 |
| 3,233,512 | 2/1966 | Sampson | 88—28 |

NORTON ANSHER, *Primary Examiner.*

WYNDHAM M. FRYE, *Assistant Examiner.*